INVENTOR.
WILLIAM HERBERT MONTGOMERY
BY

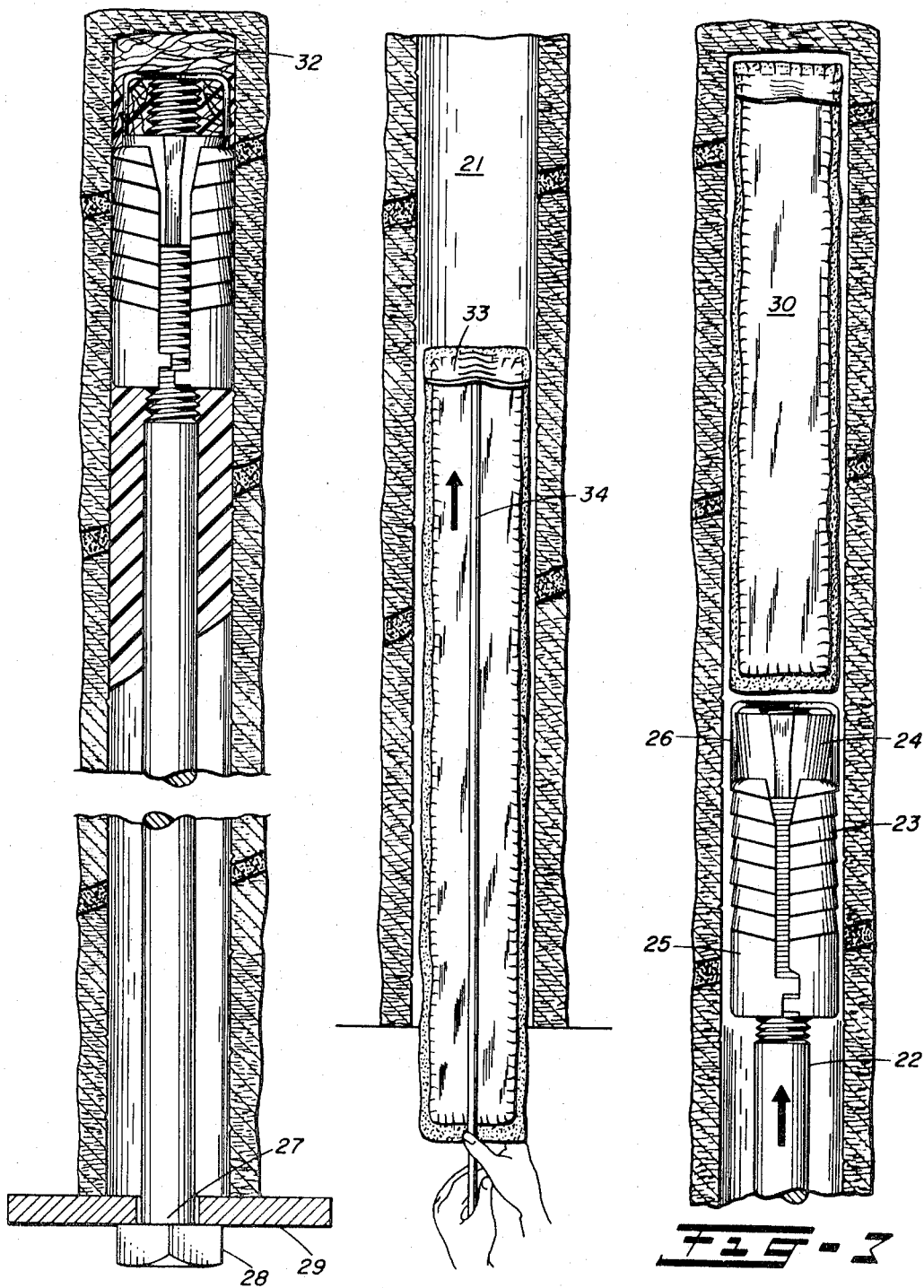

ATTORNEY

INVENTOR.
WILLIAM HERBERT MONTGOMERY
BY

ATTORNEY

United States Patent Office 3,618,326
Patented Nov. 9, 1971

3,618,326
RESIN ANCHORED REINFORCED BRITTLE STRUCTURES
William Herbert Montgomery, Stamford, Conn., assignor to American Cyanamid Company, Stamford, Conn.
Continuation-in-part of application Ser. No. 638,551, May 15, 1967. This application Oct. 24, 1969, Ser. No. 869,246
Int. Cl. E21d 20/00
U.S. Cl. 61—45 B                                          3 Claims

ABSTRACT OF THE DISCLOSURE

Expansion shell rock bolts are more firmly anchored in rock drill holes by using an ambient-temperature-setting resin to flow around and anchor parts of the shell to each other and to the rock while protecting from moisture loss or oxidative change. The resin is supplied in a package having at least two compartments, each containing part only of a thixotropic resin system; which is preferably over-catalyzed so that thorough mixing is not necessary. The packages have compartmental seals which are opened prior to insertion, with preferably some pre-mixing, at least some mixing occurring in the package as the package is placed in the hole in the rock, and additional mixing on discharge of the resin from the package as a bolt is placed into the hole in the rock. The package material is dead fold, and non-resilient so as to be compressed beyond the bolt. The shell is then expanded, with the thixotropic characteristics of the resin holding the resin in place around the expansion shell. The expansion of the shell gives immediate anchorage, and the later hardening of the resin gives a delayed but more permanent anchorage.

The same package is useful in anchoring to masonry and concrete.

RELATED APPLICATIONS

This application is a continuation-in-part of application Ser. No. 638,551, May 15, 1967, now U.S. Pat. No. 3,474,898, Oct. 28, 1969, Package of Reactable Components.

BACKGROUND OF THE INVENTION (1) Field of the Invention

This invention relates to stabilizing brittle structures of rock, concrete and masonry, including the walls and roofs of underground passages, including coal mines.

In mines, particularly coal mines, the problem of mine roof bolting is a rigorous, economic problem with both cost and time at a premium. In the mining of coal, the operation is such that the time allowed for roof bolting is small, and accordingly, a simple process that may be used by the relatively unskilled, rapidly and with freedom from error, or the possibility of error, is desired. It is desirable that each bolt have high initial load-carrying characteristics so that the bolt may be placed into a hole and tightened so as to immediately protect the mine roof. It is further desirable that the tensioning and thereby the protection from each rock bolt remain for as long as a particular underground passage is to be in use, which may be months, or years. The same method of fastening is useful in fastening machinery or structural elements to both concrete and masonry.

(2) Description of the prior art

U.S. Pat. 2,829,502, J. B. Dempsey, Mine Roof Bolt Installation, Apr. 8, 1958, discloses a paper, synthetic plastic, or rubber-like material as the sealed capsule containing a resin which is pushed ahead of a bolt into a rock hole with the cartridge being ruptured to permit the liquid resin to flow over the expansion shell. A washer is used to prevent the resin from flowing away from the expansion shell.

U.S. Pat. 2,952,129, J. B. Dempsey, Mine Roof Bolt Installation, Sept. 13, 1960, discloses inserting ahead of the bolt a fracturable container, such as glass, containing the pre-mixed resin components which glass shell is fractured to permit the liquid to flow around and protect the shell. A washer is used to retain the resin.

U.S. Pat. 2,690,879, J. R. Snyder, Metal-to-Wood Fastening for Railway Ties, Oct. 5, 1954, in FIG. 4, shows an outer plastic capsule containing a potentially thermo-setting resin with an inner plastic capsule containing the catalyst material with the dual capsules inserted in a borehole in wood ahead of a screw spike, which on insertion causes rupturing of the capsules, mixing of the catalyst with the resin to render the resin thermo-setting, and the driving of part of the mixed resins into the wood to give improved pullout between the metal and the retaining wood. The threads on the spike cut into and engage the wood walls.

U.S. Pat. 3,108,443, F. Schuermann et al., Method of Fixing Anchor Bolts in the Drill Holes, Oct. 29, 1963, now Re-issue 25,869, Oct. 5, 1965, discloses anchoring a bolt in a drilled hole by inserting frangible cartridges containing the components of a synthetic resin which components are mixed by the rotation of an inserted bolt. The bolt is not expansible, and the bolt is small enough so that its radially extending ribs terminate short of the walls of the drill hole. This patent discloses a sealing element to hold the synthetic resin in the desired location, so the resin will not flow from an overhead hole.

U. S. Pat. 3,302,410, dated Feb. 7, 1967. D. C. McLean, Rock Bolting Package Usage, discloses thixotropic room temperature hardening resins formed by the reaction of storage stable components, which resins are suitable for anchoring rock bolts in rock formations; together with methods of introducing such resins into rock formations. Additionally matter disclosed therein is claimed in Pats. 3,324,662 and 3,324,663. These patents review certain pertinent prior art.

U.S. Pat. 3,283,513, T. W. Kierans et al., Process of Mounting Elongated Members in Drill Holes, Nov. 8, 1966, shows one method of filling a rock drill hole with a self-hardening, thixotropic resin and inserting an elongated reinforcing member.

U.S. Pat. 3,082, Mar. 26, 1963, Gelpey, Compartmented Package and Divider Therefor, shows a two compartment package, with a removable clip maintaining separation of components until a desired time of use.

An early two compartment package is shown in U.S. Pat. 1,332,985, Mar. 9, 1920, Jarrett, Mixing Container.

The prior art shows many other multiple compartment packages for special usages and components in which two or more compartments store components which are to be mixed at the time of use.

SUMMARY OF THE INVENTION

It has now been found that a rapid, economical and efficient anchoring is achieved by inserting a thixotropic resin ahead of a conventional expansion shell, so that the shell is covered by and protected by the resin, and the resin also protects the rock, and aids in holding the shell in position. It is desirable that the reinforcing and resin anchoring be accomplished using the present conventional rock bolt shells. The use of the rock bolt shells, which shells expand as the bolt in them is tightened by rotation, greatly increases the complexity of rotational mixing in the bore hole. Similarly, the use of washers or other retaining means to keep the resin in position while it is hardening adds to the cost, adds to the problems of installation, and increases the chance that an inadvertent error in the positioning of such a washer, or a leak past such a washer, will give a false sense of security and a relatively hazardous area, because the bolt looks as though it is installed properly, but in fact, is capable of but holding a minimum load.

The problems of rapid installation of a trouble-free, easily-installed error-proof resin reinforcing of an expansion shell are minimized by the use of a pre-mixed resin package as here described.

The separate components of a mixable, room-temperature hardening-resin are stored in a single package having a divider between compartments. By opening the divider, the components in the separate compartments are mixed by squeezing from one end to the other of the now single compartment, so that mixing is accomplished without rupturing of the outer container. This permits the mixing to be accomplished without spillage on the user.

Further, an over-catalyzed resin is preferably used which contains more catalyst than usually used to polymerize the resin. The use of the additional catalyst is a protective measure and causes the resin to set more rapidly if thoroughly mixed, but also gives complete setting even if complete mixing is not accomplished. This is highly advantageous because the user may inadequately mix the contents of the package or barely mix at all during opening the divider, and the kneading inherent in inserting the package into the drill hole followed by the insertion of the bolt with attendant rupturing of the package gives enough mixing as to insure an adequate bond even if the pre-mixing is minimal.

For longer packages, it is desirable that the resin and the catalyst be packaged in a plurality of compartments so that the physical distance from the catalyst to the farthest corner of a resin compartment is reduced. A central catalyst compartment with a resin compartment on each end or a plurality of alternating resin and catalyst compartments insures more adequate mixing at the time of use.

Preferably, the package is a foil container made of a metallic foil, at least in part. If at least one face of a package is of a metallic foil, such as aluminum foil, or of a metallic foil with a heat-sealable coating layer, such as polyethylene, and which may additionally be reinforced by a polyester layer, the foil of the package tends to retain its integrity when the package is placed in the drill hole. Also, as the bolt is shoved in, the packaging material itself is compressed ahead of the bolt and squeezed into a small plug at the far end of the hole, with all of the resin being squeezed out and mixed as it is equeezed from the package.

Certain packaging foils and certain types of resin and hardener systems are disclosed in the following examples, it being understood that other foils and other resin systems may be used if competively priced components having similar characteristics are available.

Where not otherwise specified in this specification and claims, parts are by weight.

In the drawings:

FIG. 1 shows a resin bonded expansion shell mine roof bolt in position.

FIG. 2 shows the insertion of a package of hardenable resin into a drill hole in rock using an insertion rod.

FIG. 3 shows a resin package being pushed into a drill hole by a rock bolt without the aid of an insertion rod.

Figure 4:
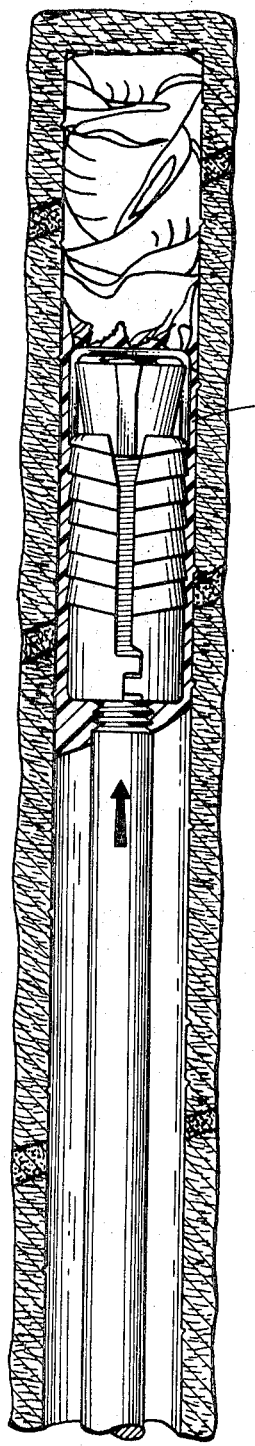
FIG. 4 shows that the resin package being breached, the envelope itself being compressed and the resin contents flowing around the expansion shell.

As shown in FIG. 3, a drill hole 21 is formed in rock in an area where additional anchorage and security is desired. Frequently but not necessarily such holes are overhead drill holes in the roof of an underground mine. The problem is particularly acute in coal mines where the loss of life by roof failure is a serious problem. The hole may be formed by an ordinary rock drill, by a melting torch, or a laser beam or other means; but will be referred to hereafter as a drill hole as such is a conventional practice as drilling is the usual method of hole formation. The hole is formed to a depth just slightly greater than the length of the rock bolt assembly, which includes the rock bolt 22 and the expansion shell 23 on the end first inserted in the drill hole. Any of the conventional forms of expansion shells may be used. A typical such shell is shown in FIG. 3 which consists of an expansion wedge 24, which fits between two anchoring members 25 which are held during insertion by a bail 26. In accordance with conventional practice the expansion wedge is drawn between the anchoring members on rotation of the rock bolt 22, and expands the anchoring members against the walls of the drill hole.

At the face end 27 of the rock bolt, is a bolt head 28 which rests against a retaining plate 29.

It has been the practice to use such an assembly consistently in mine roof bolting with the bolt head 28 being drawn up against the retaining plate 29, which presses against the face of the rock as tension is applied by tightening the rock bolt. The expansion wedge forces the anchoring members into engaging contact with the walls of the drill hole. In such conventional use, the softness of the rock or oxidative action on the rock or loss of moisture from the rock can in the course of time permit the shell to become loose so that the rock bolt is no longer under tension, and the rock adjacent to drill hole is no longer under compression. It is only when the rock is under compression that the rock has adequate mechanical strength and predictably may be used as a load-bearing member or zone in an engineering structure.

As shown in FIG. 3, a resin package 30 is forced against the far end of the drill hole by the expansion shell. As shown in FIG. 4, the package is broken so that the resin 31 is squeezed from the package and flows around the expansion shell. In the complete assembly the resin package is compressed to a small crumpled wad 32 ahead of the expansion shell, so that portions of the material forming the walls of the package are prevented from being trapped between the expansion shell and the drill hole. The package materials could form a zone of weakness at this point and permit the shell to slip on the package material rather than forcibly engage the rock.

The package may have a pocket 33 at the end thereof and an insertion rod 34 may be used for insertion, particularly for very deep holes. Usually the miner can insert the package into the hole by hand very readily, and shove the package to the far end of the hole as he inserts the expansion shell on the end of the rock bolt. As the package is compressed between the far end of the hole and the shell, the resin is squeezed from the package with mixing of the components.

The resin package 30 may be made from two sheets of laminated material, sealed at the side edges, or may be made from a tube cut into segments of appropriate length. The ends of the tube thus formed are sealed to form the resin compartment.

Figure 5:
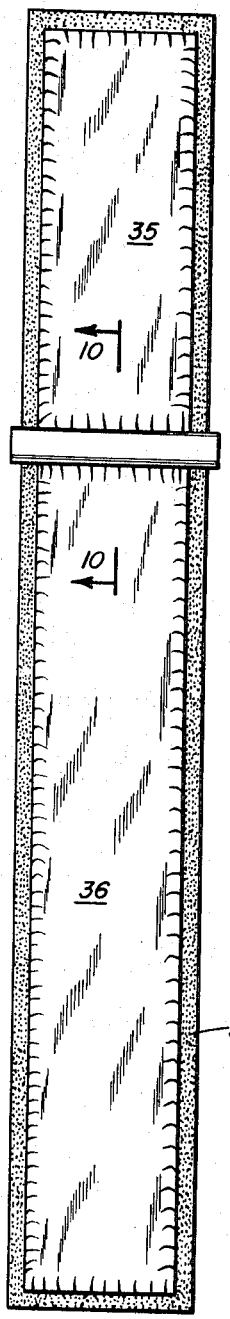
FIG. 5 shows a two-compartment package for two separate components with a removable mechanical retaining clip therebetween.

As shown in FIG. 5, the resin package has a hardener compartment 35 and a resin compartment 36. The resin and hardener compositions in these compartments are discussed below.

As shown in FIG. 5, the two compartments are separated by a mechanical seal consisting of a core member 37 and a clamp member 38. In manufacture it is convenient to heat seal the longitudinal walls of the package together with longitudinal heat seals 39, then place the core member and the clamp member, after which each of the compartments is filled and the ends of the package are sealed.

Figure 6:
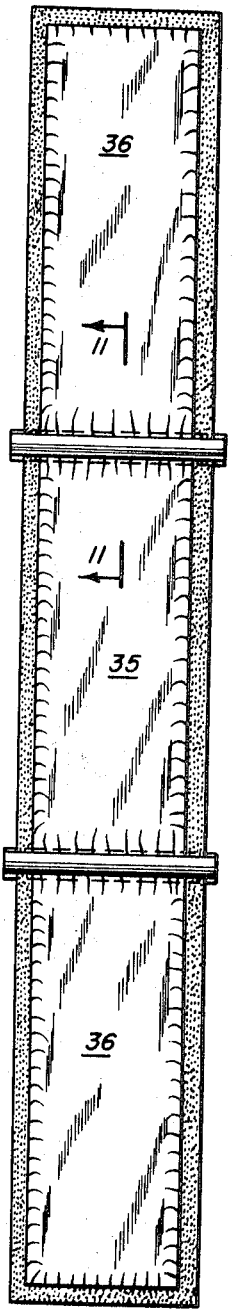
FIG. 6 shows a three-compartment resin package, two of the compartments of which may contain the same component.

As shown in FIG. 6, the package may contain two resin compartments 36 and a single hardener compartment 35. For most mine roof bolts which use a ⅝" to ⅞" bolt, about 6 cubic inches of combined resin components form a convenient size of package. The diameter of the package is small enough so that it may be conveniently inserted in the drill hole, hence a width of 2–2½" for the flattened package is convenient. It is to be understood that the packages may be much larger or much smaller as the bolt may be ½" or less in diameter, and for some purposes a bolt as much as 3" in diameter may be used with a correspondingly large shell, and resin volume.

A quantity of resin which covers the shell only gives a very good anchorage. For example, 6 cubic inches of resin in a package will protect the shell, and give anchorage to the shell end. Full length resin bonding, where the rock bolt is bonded for the entire length can take from 50 to several hundred cubic inches of resin. The resin can be somewhat expensive, and the placement and handling can entail additional expense, so the saving of resin quantity is quite advantageous. For most situations where a tensioned rock bolt is used, the shell anchoring only gives a more than adequate bond, with more economical and rapid placement. The saving in placement time permits the present resin packages to be used in coal mine roof bolting without major deviation from the present conventional operating cycles.

Figure 11:
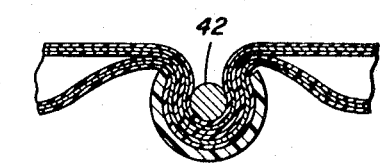
FIG. 11 is another type of clip closure as shown at section 11—11 of FIG. 6.

The core member 37 conveniently is of an I-shape cross section so that a C-clamp member 38 can engage and hold the package foils 40 and 41 tightly clamped between the clamp member and the core member, and thus prevent premature mixing of the resin and hardener. The core member may be a core rod 42 as shown in FIG. 11 with a C-clamp holding the foils tightly against the rod.

Figure 12:
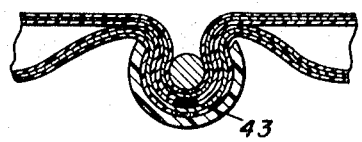
FIG. 12 is a closure similar to that shown in FIG. 11 but in which the foils are lightly heat-sealed to insure increased leak resistance.
Figure 10:
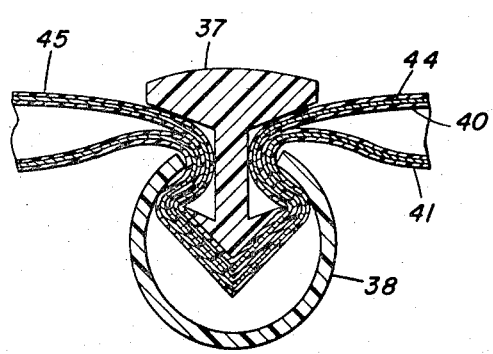
FIG. 10 is a closure as shown at section 10—10 of FIG. 5.

Manufacturing tolerances for the core member and clamp member as well as the foil are less critical if a light seal 43 is used as shown in FIG. 12 to seal the top foil and the bottom foil together, as by a heat seal, with the clamp furnishing mechanical strength and the light seal giving liquid tightness.

The foils used are conveniently, but not necessarily, a metallic foil 44, which may be aluminum, coated on the outside surface with a polyester layer 45 (such as is sold under the trademark "Mylar") and coated on the inside with a heat-sealable layer 46, conveniently of polyethylene. The foil is deformable and when crumpled tends to retain such configuration, and therefore may be easily displaced on insertion in the bolt hole. The polyester layer gives additional strength, additional impermeability, should the metal foil layer have pin holes, has a high enough melting point that the inner heat-sealable layer may be melted together by a heating clamp applied externally without the outer layer itself becoming softened.

Whereas the seals are referred to as heat seals, obviously the heat may be internally generated by ultrasonic techniques, or dielectric heating, or other sealing methods known to the industry may be used. The characteristics, if not the method of manufacture, are best described to those skilled in the art by the designation "heat-sealed."

Figure 9:
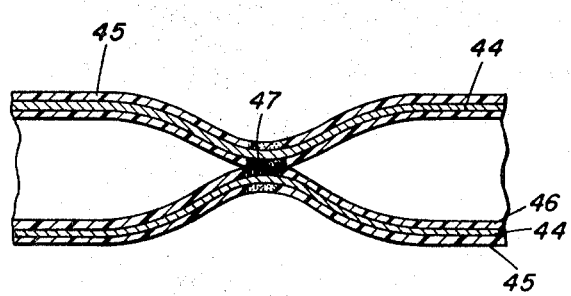
FIG. 9 is a cross section at line 9—9 of FIG. 7, showing the rupturable bond between the foil faces of the package.

In addition to the use of external restraining clamp members, the two compartments may be formed by a strippable seal 47 as shown in FIG. 9. Such strippable seals are formed by heating the top and bottom foils sufficiently that a comparatively weak bond is formed between the foil. The bond is strong enough to permit shipment and handling of the package prior to use, but is weak enough that on the application of pressure to the contents of either compartment, the strippable bond yields, permitting mixing of the resin components. As this seal is weaker than the edge seals, the mixing may be achieved in the package without rupturing of the package.

Figure 7:
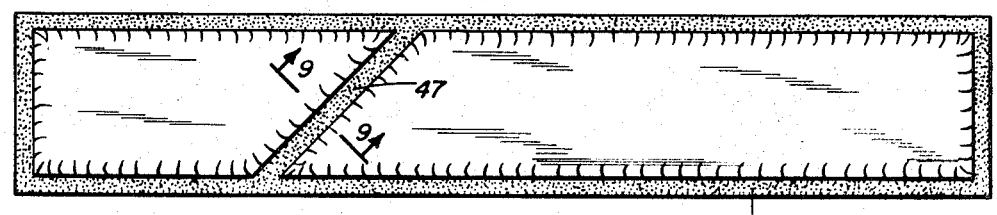
FIG. 7 shows a two-compartment package in which the faces of the package are weakly bonded together, with a diagonal seal.
Figure 8:
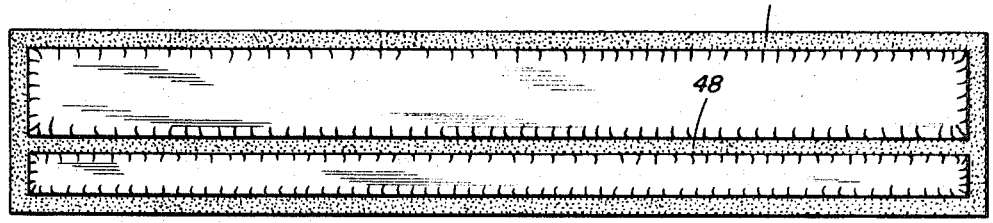
FIG. 8 shows a two-compartment package for two components in which the rupturable seal extends the full length of the package.

The strippable seal 47 may be across the package as shown in FIG. 7 or may be longitudinal seal 48 as shown in FIG. 8.

In use the strippable seals are ruptured or the clamps removed and the components of the resin mixed together, at least in part before the package is placed in the drill hole.

For many purposes the mixing achieved by removing the clamp, or breaching the strippable seal together with the agitation achieved by rounding and insertion of the package in the bolt hole together, with the admixing which occurs as the package is breached, and the resin squeezed therefrom gives adequate intermixing without an undue amount of time being required for in-package mixing prior to insertion.

The amount of mixing required in part depends upon the resin compositions.

For resin compositions of the epoxy or polyurethane type, which harden essentially by stoichiometric reactions, comparatively thorough mixing is advantageous. Preferably, resins of the polyester type are used, in which the hardener component is catalytic in character, so that once initiated, the reaction continues with the more highly catalyzed portions of the resin reacting fastest and the lesser activated portions taking longer, but with reaction occurring throughout the entire resin mass so that a firm anchoring resin results with minimal mechanical mixing.

In use in anchoring the shell to the walls of the drill hole, the resin flows into intimate contact with both, giving full protection of the shell from moisture and oxygen and also full protection of the drill hole walls. As the anchoring is firm, the initial tightening of the rock bolt is adequate for the entire life of the fastening, even if it is several years.

For test purposes a more complex rock bolt can be used in which a separate nut is threaded on the face end, or a U-shaped wedge may be forced between the bolt head 28 and the retaining plate 29 to give tightening without rotation at any time after emplacement. Tests with such fastenings may be desirable to furnish evidence of the integrity of the rock bolt reinforcement throughout the life of an installation. For ordinary rock structures, the initial tightening is all that is ever required, and the more complex bolts permitting a subsequent tensioning are not economically justified.

The resin per se

The resins which can be used with the present package include both epoxy and polyurethane resins which contain enough finely divided silica or microcrystalline silicates to give a thixotropic resin which will not flow out of the bolt hole or from the shell during hardening. A group of such resins are described in Kierans, et al. 3,283,513, supra.

As a thixotropic composition is non-Newtonian by definition, a conventional viscosity reading is not completely descriptive unless the shear rate is given. In accordance with conventional practice, the viscosity can be measured on a Brookfield Viscometer. A resin for the present package, when mixed, and when measured with a number 6 spindle, on a RVF model, at 2 revolutions per minute, had a viscosity at 65° F. of 82,500 centipoises, at 10 r.p.m. 21,500, and at 20 r.p.m., 14,000. If the viscosity as measured by a number 4 spindle at 4 r.p.m. is below about 12,000 centipoises, the resin tends to flow from the shell. If the viscosity is above about 150,000, the resin tends to become too thick for convenient handling.

The polyester resins are the preferred resins, as the catalytic nature of the hardening process permits more flexibility in proportions, and in mixing procedures.

Certain polyester resins which give good results are detailed in the patent to McLean, 3,302,410. The polyester resins for the present invention also includes resins in which more conventional polyester resins are mixed with a pyrogenic silica or silicate, such as Cab–O–Sil, or Avibest-C. Preferably about 10% sand is included in the composition—such sand gives tooth to the composition, and prevents the shell from rotating during installation. Examples 35 and 37 of said 3,302,410 disclose compositions containing sand.

The ratio of catalyst is preferably such that at the temperature of installation of the resin, the composition starts to gel after not less than about 5 minutes, to permit time for installation of the shell in the hole, and tightening, and preferably full hardening occurs in 24 hours. These limits may be exceeded, but a faster gelling resin is difficult to handle sufficiently rapidly, and a slower hardening resin is so slow in hardening that the advantages of resin anchorage of the shell are delayed.

As the resins are set forth in adequate detail in the cited art, a limited number of examples are shown.

EXAMPLE 1

A polyester resin was prepared, following the procedure of Example 1 of Pat. 3,091,936, as follows:

Into a suitable reaction vessel equipped with stirrer, thermometer and an air-cooled reflux condenser were charged 1910 parts maleic anhydride, 1480 parts of phthalic anhydride and 2540 parts of propylene glycol. With carbon dioxide passing through the reaction mixture at a rate capable of providing an inert atmosphere above the surface of the mixture, the reactive ingredients were heated gradually with stirring to a temperature of 180° C.–200° C. Heating was continued in the indicated esterification temperature range until the acid number had dropped to 38. The time required to achieve this degree of condensation was approximately 12–15 hours. Thereupon, the reaction mixture was cooled to 80° C. and the hot polyester resin was cut with methylstyrene in the proportion of resin to methylstyrene of 70:30, respectively.

To 84.5 parts of the resin was added 0.006 part of hydroquinone as an inhibitor, 0.9 part of Emulphor EL–719, a proprietary hydrophilic, non-ionic surfactant, made by polyoxyethylating vegetable oil, 0.004 to 0.04 part of diethylaniline, 1.0 part vinyl toluene, 9.4 parts water and 4 parts of Cab-O-Sil, a proprietary pyrogenic colloidal silica and 10 parts of 66 mesh sand (00). The amount of diethyl aniline is adjusted to give a gel time of 10 to 15 minutes at 75° F.

The catalyst consists of a mixture of 92.25% portland cement, 5.75% benzoyl peroxide and 2% dibutyl phthalate. The dibutyl phthalate reduces dusting.

A laminate of 0.35 mils aluminum (0.00035 inch) coated inside with 2 mils of polyethylene and outside with 0.5 mil of Mylar was formed into a package 16 inches long, and 2½ inches wide, with a ⅜ inch outside seal, and divided by a clip as shown in FIG. 9 into a compartment about 6 inches long and another 10 inches long. Into the larger was filled 132 grams of the resin paste, and into the smaller compartment was filled 64 grams of the hardener. The package is found to be adequately storage stable, and in use sets rapidly with full anchorage of the shell.

Conveniently the laminate itself has dead fold properties—that is when bent or deformed, the foil remains in the position to which shaped. A thin metallic layer tends to give this characteristic. The layer is conveniently of aluminum, and may be either between the polyester and the polyethylene, or may be on the outside of the package, outside of both foils. Placing the aluminum layer on the outside surface gives an advantage in printing, as the aluminum surface is receptive to well known inks, and additionally, the aluminum can be dissolved off if the interior characteristics of the package are to be observed to inspect the adequacy of seal, freedom from segregation of components, and proper fill of compartments.

Study of transparent models under polarized light, to study characteristics of the strains introduced by the use of rock bolt shells has developed the unexpected showing that the edges of the rock bolt shell cuts into the brittle material, and introduces a high compressive strain; which strain is highly localized, and at times often introduces a tension stress in closely adjacent areas, and invariably introduces shear stress, and areas of rapid variation in stress. The use of a bonding resin to bond the shell to the rock or other material, reduces the rate of change of stresses, and usually tends to minimize or eliminate tension stresses. Markedly superior holding characteristics develope as a result of minimizing the areas of tension, and high rate change of stress. Certain aspects of strain propagation in brittle structures are disclosed in 3,394,527, July 30, 1968, McLean Reinforcing Anisotropic Non-Homogeneous Engineering Structures.

I claim:

1. A method of reinforcing a brittle engineering structure of material strong in compression and weak in tension, such as rock, concrete, and masonry, having an exposed face, which comprises:

forming a comparatively long, small, drill hole therein,
inserting in said hole a package containing two unreacted but reactable components, which are in separate compartments during storage, but mixed at time of placement, and which reactable components cure to form an anchoring resin, which resin composition before curing is thixotropic and of such consistency that it may be readily mixed, but such that the resin will retain itself in position and resist the forces of gravity in an overhead hole between the time of placement and the time of cure, and which package is formed of a film which is readily permanently deformable,
inserting a reinforcing member into the hole after the package,
forcing the package to the far end of the hole and thereby squeezing the resin components from the package while the packaging material remains essentially in one piece and said packaging material is compressed ahead of the end of the reinforcing member; and simultaneously at least partially mixing said reactable components; then
curing said reactable components,
thereby holding said reinforcing member securely in location.

2. The method of claim 1 in which the reinforcing member has a non-rotating expansible metal shell on the end inserted into the drill hole, and means for expanding the shell against the walls of the drill hole with the surface of the shell covered by the thixotropic resin, and compressing a retaining plate against the exposed face, and includes the steps of:

expanding the shell, and imparting tension to said reinforcing member,
thereby compressing the adjacent brittle structure, and thus markedly increasing the structural strength of the assembly, and covering the expansion shell with the anchoring resin thereby protecting the shell from moisture and oxygen, and protecting the walls of the drill hole adjacent to the shell.

3. The method of claim 2 in which the structure is the roof of a coal mine.

References Cited

UNITED STATES PATENTS

| | | | |
|---|---|---|---|
| 2,952,129 | 9/1960 | Dempsey | 61—45 B |
| 3,298,144 | 1/1967 | Fischer | 61—45 B X |
| 3,385,427 | 5/1968 | Stouls | 61—45 B X |
| 3,108,443 | 10/1963 | Schuermann et al. | 61—45 |
| 3,302,410 | 2/1967 | McLean | 61—45 X |
| 3,308,585 | 3/1967 | Fischer | 61—45 X |
| 3,324,663 | 6/1967 | McLean | 61—45 X |
| 3,430,449 | 3/1969 | Novotny et al. | 61—45 |

DENNIS L. TAYLOR, Primary Examiner

U.S. Cl. X.R.

52—698

UNITED STATES PATENT OFFICE
CERTIFICATE OF CORRECTION

Patent No. 3,618,326          Dated November 9, 1971

Inventor(s) WILLIAM HERBERT MONTGOMERY

It is certified that error appears in the above-identified patent and that said Letters Patent are hereby corrected as shown below:

Column 2, line 41 "additionally" should read -- additional --.

Column 2, line 49 "3,082" should read -- 3,082,867 --.

Signed and sealed this 18th day of April 1972.

(SEAL)
Attest:

EDWARD M. FLETCHER, JR.          ROBERT GOTTSCHALK
Attesting Officer          Commissioner of Patents